United States Patent
Komatsu

(10) Patent No.: US 11,764,585 B2
(45) Date of Patent: Sep. 19, 2023

(54) WIND POWER GENERATION SYSTEM AND POWER CONVERSION APPARATUS

(71) Applicant: TOSHIBA MITSUBISHI-ELECTRIC INDUSTRIAL SYSTEMS CORPORATION, Chuo-ku (JP)

(72) Inventor: Hiroyoshi Komatsu, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 91 days.

(21) Appl. No.: 16/976,629

(22) PCT Filed: Oct. 29, 2018

(86) PCT No.: PCT/JP2018/040134
§ 371 (c)(1),
(2) Date: Aug. 28, 2020

(87) PCT Pub. No.: WO2020/089972
PCT Pub. Date: May 7, 2020

(65) Prior Publication Data
US 2021/0006074 A1    Jan. 7, 2021

(51) Int. Cl.
*H02J 3/38* (2006.01)
*H02J 3/46* (2006.01)
(Continued)

(52) U.S. Cl.
CPC ............ *H02J 3/472* (2020.01); *H02J 9/062* (2013.01); *H02M 5/40* (2013.01); *H02J 2300/28* (2020.01)

(58) Field of Classification Search
CPC ............ H02J 3/472; H02J 9/062; H02M 5/40
See application file for complete search history.

(56) References Cited

U.S. PATENT DOCUMENTS 7,391,126 B2 * 6/2008 Liu ..................... F03D 9/11
290/44
9,334,749 B2 * 5/2016 Das ...................... H02J 9/061
(Continued)

FOREIGN PATENT DOCUMENTS

CN    101534013 A    9/2009
CN    103890385 A    6/2014
(Continued)

OTHER PUBLICATIONS

Extended European Search Report dated Mar. 10, 2021 in European Patent Application No. 18905895.1, 9 pages.
(Continued)

*Primary Examiner* — Harry R Behm
(74) *Attorney, Agent, or Firm* — Oblon, McClelland, Maier & Neustadt, L.L.P.

(57) ABSTRACT

A wind power generation system includes a power generator body, an auxiliary device that assists the power generator body, and a power conversion apparatus that converts first AC power generated by the power generator body to second AC power, and outputs the second AC power to an electric power grid. The power conversion apparatus includes a first power conversion circuit, a second power conversion circuit, a power storage element that receives DC power from the first power conversion circuit via a first passing point, a breaker, and a control unit. When the power generator body is in a power generation standby state, the control unit sets a parallel-off mode and controls the second power conversion circuit to convert power of the power storage element to third AC power having a preset voltage. The auxiliary device is configured to receive the second AC power or the third AC power.

3 Claims, 6 Drawing Sheets

(51) Int. Cl.
*H02J 9/06* (2006.01)
*H02M 5/40* (2006.01)

(56) References Cited

U.S. PATENT DOCUMENTS

| | | | | |
|---|---|---|---|---|
| 2009/0230689 A1* | 9/2009 | Burra | ...................... | H02J 9/062 |
| | | | | 290/55 |
| 2011/0291479 A1* | 12/2011 | Lee | ...................... | H02J 3/381 |
| | | | | 307/43 |
| 2012/0086399 A1* | 4/2012 | Choi | ...................... | H02J 7/0026 |
| | | | | 320/116 |
| 2013/0184884 A1* | 7/2013 | More | ...................... | F03D 9/12 |
| | | | | 290/44 |
| 2014/0225369 A1* | 8/2014 | Bodewes | ...................... | H02P 9/00 |
| | | | | 290/44 |
| 2015/0001848 A1* | 1/2015 | Imaie | ...................... | F03D 9/25 |
| | | | | 290/44 |
| 2016/0285252 A1* | 9/2016 | Burra | ...................... | F03D 9/255 |
| 2018/0342875 A1* | 11/2018 | Ganireddy | ...................... | H02M 5/42 |

FOREIGN PATENT DOCUMENTS

| | | |
|---|---|---|
| EP | 2 806 159 A1 | 11/2014 |
| JP | 2007-195315 A | 8/2007 |
| JP | 2012-231624 A | 11/2012 |
| WO | WO 2015/186232 A1 | 12/2015 |
| WO | WO 2018/087876 A1 | 5/2018 |

OTHER PUBLICATIONS

International Search Report and Written Opinion dated Jan. 15, 2019 in PCT/JP2018/040134 filed on Oct. 29, 2018.
Chinese First Notice of Reasons for Refusal dated Jan. 10, 2023, in Chinese Patent Application No. 201880033545.9, therein, 19 pages (with English Machine Translation).

* cited by examiner

WIND POWER GENERATION SYSTEM AND POWER CONVERSION APPARATUS

FIELD

The present application relates to a wind power generation system and a power conversion apparatus.

BACKGROUND

The technology of wind power generation systems has been developed, and for example, PTL 1 and PTL 2 are known as documents related to wind power generation systems.

In grid-connection regulations of a wind power generation system, an FRT (fault ride through) capability is provided. FRT is a publicly known technology, and the details thereof are explicitly described in paragraph [0023] of PTL 2, for example. The wind power generation systems according to PTL 1 and PTL 2 each include a chopper circuit for consuming surplus power that cannot reversely flow to a grid during execution of FRT.

CITATION LIST

Patent Literature

[PTL 1] JP 2012-231624 A
[PTL 2] WO 2015/186232

SUMMARY

Technical Problem

A wind power generation system includes various auxiliary devices, in addition to a power generator body that generates power upon receiving wind power. Examples of the auxiliary devices include a yaw motor for adjusting the direction of a nacelle in which the power generator body is housed.

Power needs to be supplied to the auxiliary devices not only when the wind power generation system is generating power upon receiving wind, but also when the wind power generation system is in a power generation standby state in which the system is unable to generate power. In a conventional grid-connected wind power generation system, power is supplied from an electric power grid to the auxiliary device during a power generation standby state. As a result, there has been a problem that the consumption of power from the electric power grid is large.

The present application has been made in order to solve the aforementioned problems, and an object thereof is to provide a wind power generation system in which extraction of power for an auxiliary device from an electric power grid can be suppressed.

Further, in the conventional technologies, useless power is consumed due to a resistor connected to a chopper circuit during execution of FRT, as described in PTL 1 and PTL 2. Therefore, the present inventor has focused on the problem of such useless power loss.

Another object of the present application is to provide a power conversion apparatus in which power loss that is generated during execution of FRT can be reduced.

Solution to Problem

A wind power generation system according to the present application includes:

a power generator body that generates first AC power from wind power;
an auxiliary device that assists the power generator body; and
a power conversion apparatus that converts the first AC power from the power generator body to second AC power, and outputs the second AC power to an electric power grid, wherein
the power conversion apparatus includes
a first power conversion circuit that converts the first AC power to DC power,
a second power conversion circuit that converts the DC power resulting from conversion at the first power conversion circuit to the second AC power,
a power storage element that stores power by receiving the DC power from the first power conversion circuit via a first passing point provided between the first power conversion circuit and the second power conversion circuit,
a breaker that is provided between the second power conversion circuit and the electric power grid, and
a control unit that controls the second power conversion circuit and the breaker, wherein
when the power generator body is generating power, the control unit brings the breaker into conduction so as to set a grid-connected operation mode in which the second power conversion circuit cooperates with the electric power grid, and controls the second power conversion circuit to convert the DC power from the first power conversion circuit to the second AC power during the grid-connected operation mode,
when the power generator body is in a power generation standby state which is a time period of being on standby for power generation, the control unit shuts off the breaker so as to set a parallel-off mode in which the second power conversion circuit is disconnected from the electric power grid, and controls the second power conversion circuit to convert power of the power storage element received by the second power conversion circuit via the first passing point, to third AC power having a preset voltage, and
the auxiliary device is configured to receive the second AC power or the third AC power outputted from the second power conversion circuit via a second passing point provided between the second power conversion circuit and the breaker.

A power conversion apparatus according to the present application includes:

a first power conversion circuit that converts first AC power to DC power;
a second power conversion circuit that converts the DC power resulting from conversion at the first power conversion circuit to second AC power, and outputs the second AC power to an electric power grid;
a chopper circuit that is connected to a first passing point provided between the first power conversion circuit and the second power conversion circuit, and that converts power received from the first passing point;
a resistor for consuming power outputted from the chopper circuit;
a power storage element that is provided on an output side of the chopper circuit so as to be in parallel with the resistor; and
a switch that selectively connects the resistor and the power storage element to the chopper circuit.

Advantageous Effects

With the wind power generation system according to the present application, the third AC power can be generated from power of the power storage element when the wind power generation system is in the power generation standby state, and the third AC power can be given to the auxiliary device. As a result, during the power generation standby state, extraction of power for the auxiliary device from the electric power grid can be suppressed.

With the power conversion apparatus according to the present application, when the chopper circuit is actuated during execution of FRT, output power from the chopper circuit can be given to the power storage element. Accordingly, at least a part of power that cannot reversely flow to the electric power grid during execution of FRT can be stored. The power stored in the power storage element can be reused as needed, whereby power loss that is generated by execution of FRT can be reduced.

DESCRIPTION OF EMBODIMENTS

Figure 1:
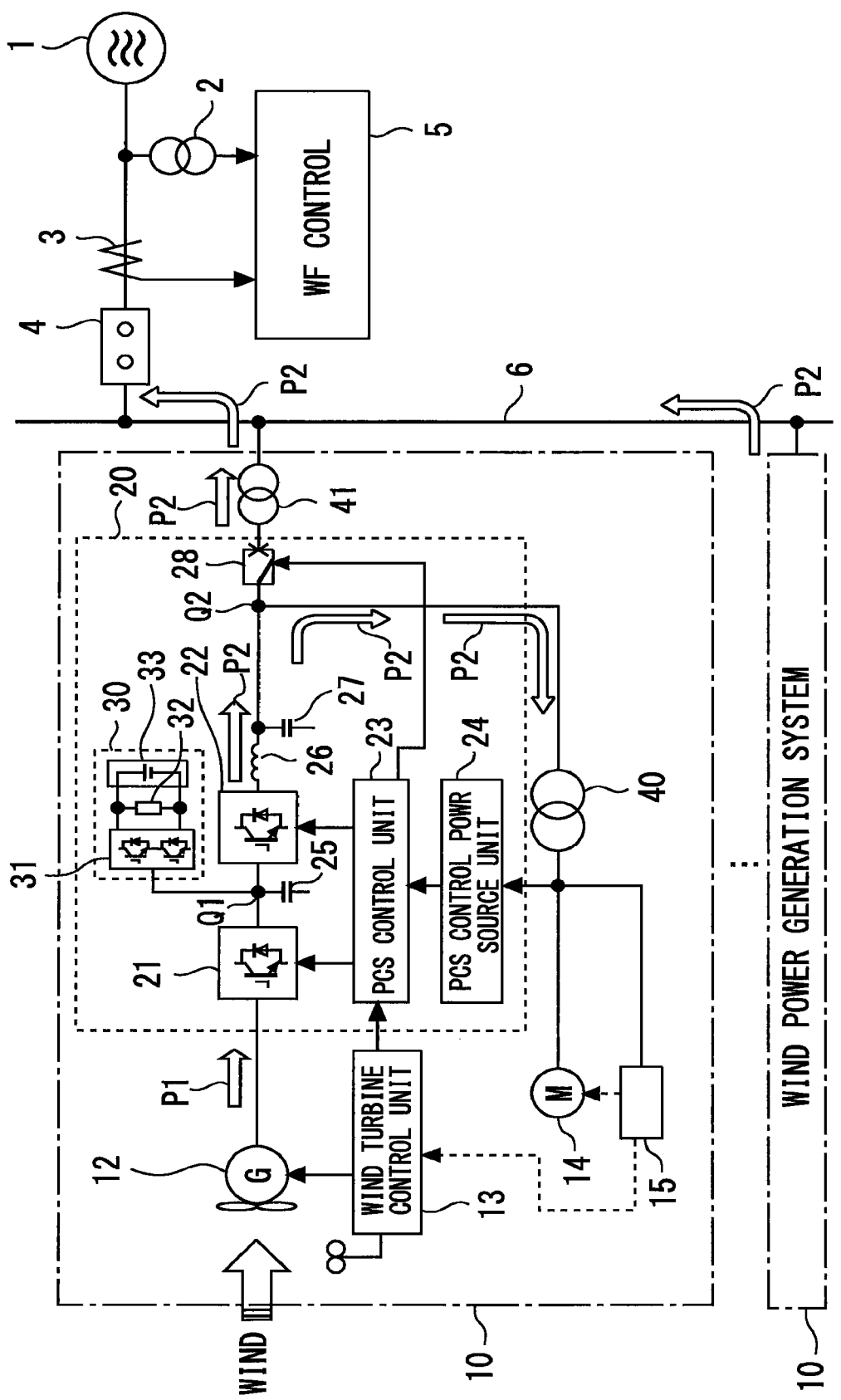
FIG. 1 is a diagram illustrating the configuration of a wind power generation system and a power conversion apparatus according to an embodiment, and also illustrating the operation during a power generation mode thereof.

FIG. 1 is a diagram illustrating the configuration of a wind power generation system 10 and a power conversion apparatus 20 according to an embodiment, and also illustrating the operation during a power generation mode thereof. In FIG. 1, a plurality of the wind power generation systems 10 operate in cooperation with the electric power grid 1.

The plurality of wind power generation systems 10 are connected to the electric power grid 1 via a transmission line 6. A transformer 2, a current meter 3, a high-order breaker 4, and a WF (wind farm) control unit 5 are provided between the electric power grid 1 and the transmission line 6.

As illustrated in FIG. 1, each of the wind power generation systems 10 includes a power generator body 12, an auxiliary device 13, an auxiliary device 14, an auxiliary device control power source unit 15, the power conversion apparatus 20, a transformer 40, and a transformer 41.

The power generator body 12 generates power from wind power. The power generated by the power generator body 12 is first AC power P1. The auxiliary device 13 and the auxiliary device 14 include various devices for assisting the power generation operation of the power generator body 12. The auxiliary device 13 is a wind turbine control unit.

The wind power generation system 10 has a nacelle in which the power generator body 12 is housed. In the actual wind power generation system 10, the power generator body 12 and the power conversion apparatus 20 are ordinarily housed in the nacelle in a collective manner.

The auxiliary device 14 is a motor part including a pitch motor and a yaw motor. The pitch motor and the yaw motor are constantly operated according to the wind state, and are intermittently actuated. When the yaw motor included in the auxiliary device 14 is driven, the direction of the nacelle can be adjusted.

The power conversion apparatus 20 converts the first AC power P1 from the power generator body 12 to second AC power P2. The power conversion apparatus 20 outputs the second AC power P2 to the electric power grid 1.

The power conversion apparatus 20 includes a first power conversion circuit 21, a second power conversion circuit 22, a PCS control unit 23, a PCS control power source unit 24, a DC capacitor 25, an AC reactor 26, an AC capacitor 27, a breaker 28, and an energy consumption circuit 30.

The first power conversion circuit 21 is a converter circuit that converts the first AC power P1 to DC power. The second power conversion circuit 22 is an inverter circuit that converts the DC power resulting from conversion at the first power conversion circuit 21 to the second AC power P2. The output end of the second power conversion circuit 22 is connected to one end of the AC reactor 26.

The PCS control unit 23 controls the second power conversion circuit 22 and the breaker 28. The PCS control power source unit 24 supplies a control power source to the PCS control unit 23.

One end of the DC capacitor 25 is connected to a first passing point Q1. The other end of the AC reactor 26 is connected to the breaker 28. One end of the AC capacitor 27 is connected to a connection point between the AC reactor 26 and the breaker 28.

The breaker 28 is provided between the second power conversion circuit 22 and the electric power grid 1. When the breaker 28 is brought into a connected state, the second power conversion circuit 22 and the electric power grid 1 can be interconnected. When the breaker 28 is brought into a shut-off state, the second power conversion circuit 22 and the electric power grid 1 are disconnected from each other, whereby the wind power generation system 10 can be paralleled off from the electric power grid 1.

As illustrated in FIG. 1, the energy consumption circuit 30 includes a chopper circuit 31, a resistor 32, and a first power storage element 33. The energy consumption circuit 30 is a circuit for absorbing power that cannot reversely flow to the electric power grid 1 during execution of FRT.

The energy consumption circuit 30 is connected to the first passing point Q1. The first passing point Q1 is provided on an electric path between the first power conversion circuit 21 and the second power conversion circuit 22.

The first power storage element 33 can receive the DC power resulting from conversion at the first power conversion circuit 21, via the first passing point Q1. The first power storage element 33 can store power by receiving the DC power. An explanation of the configuration and operation of the energy consumption circuit 30 will be given in detail later with use of FIG. 3.

Figure 2:
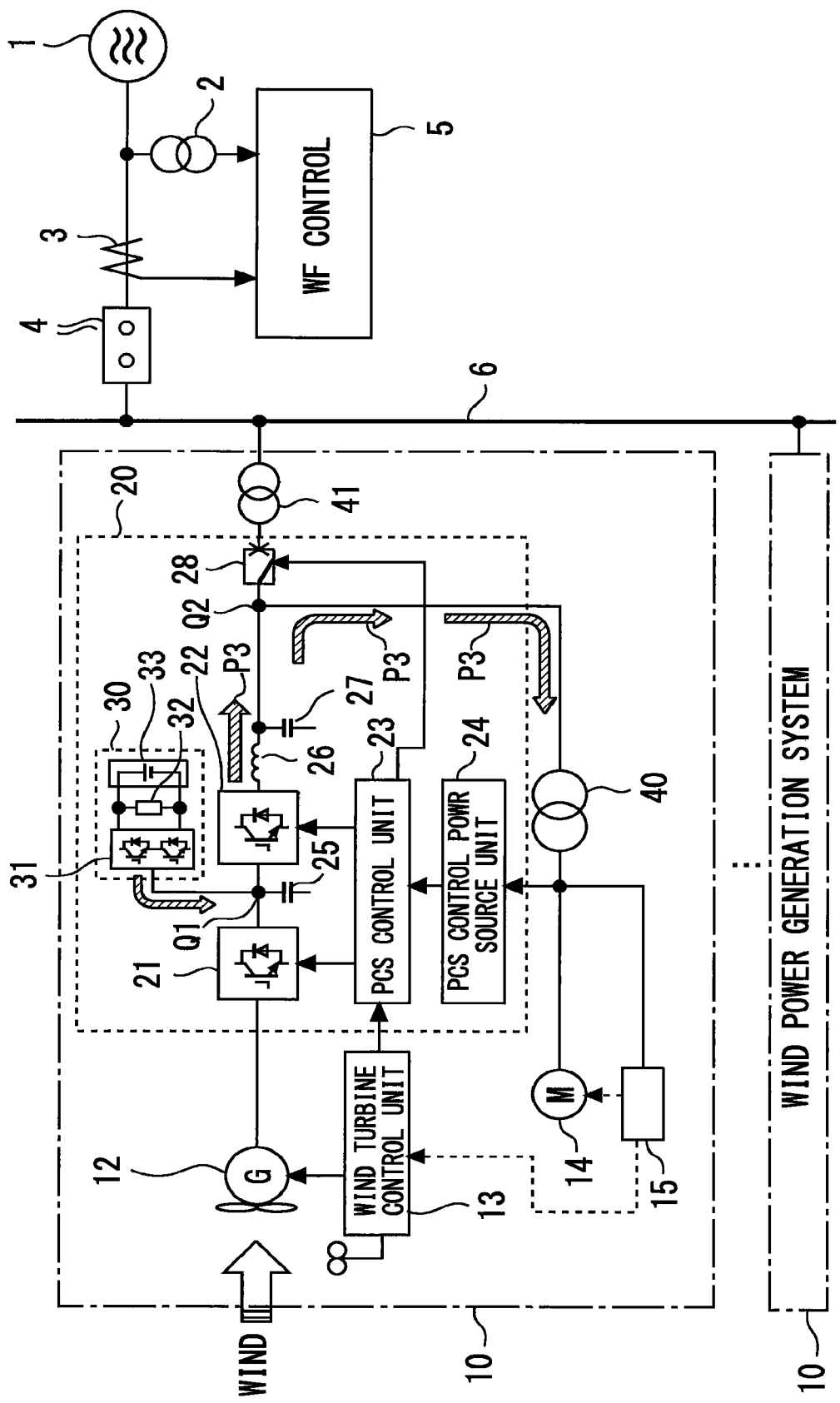
FIG. 2 is a diagram illustrating the configuration of the wind power generation system and the power conversion apparatus according to the embodiment, and also illustrating the operation during a power generation standby mode thereof.

FIG. 2 illustrates a second passing point Q2. The second passing point Q2 is provided on an electric path between the second power conversion circuit 22 and the breaker 28. The second passing point Q2 is connected to one end of the transformer 40.

The other end of the transformer 40 is connected to a connection point to which the auxiliary device 14, the auxiliary device control power source unit 15, and the PCS control power source unit 24 are connected. Accordingly, the auxiliary device 14, the auxiliary device control power source unit 15, and the PCS control power source unit 24 can receive power supply from the second passing point Q2 via the transformer 40.

In addition, the auxiliary device control power source unit 15 supplies a control power source to the auxiliary device 13, and also supplies a control power source to a motor control circuit (not illustrated) included in the auxiliary device 14. Therefore, the auxiliary device 13 also can receive power supply from the second passing point Q2, via the transformer 40 and the auxiliary device control power source unit 15.

One end of the transformer 41 is connected to the breaker 28. The other end of the transformer 41 is connected to the transmission line 6.

The PCS control unit 23 brings the wind power generation system 10 into a grid-connected operation mode when the power generator body 12 is generating power. In the grid-connected operation mode, the breaker 28 is brought into conduction such that the second power conversion circuit 22 cooperates with the electric power grid 1. In the grid-connected operation mode, the PCS control unit 23 controls the second power conversion circuit 22 to convert the DC power from the first power conversion circuit 21 to the second AC power P2.

FIG. 2 is a diagram illustrating the configuration of the wind power generation system 10 and the power conversion apparatus 20 according to the embodiment, and also illustrating the operation during a power generation standby mode thereof. That is, the wind power generation system 10 has a "power generation standby mode" in which the power generator body 12 is on standby for power generation. Also during the power generation standby mode, the auxiliary device 13, the auxiliary device 14, and the like, in the wind power generation system 10, are actuated, as needed.

During the power generation standby mode, the PCS control unit 23 brings the wind power generation system 10 into the "parallel-off mode". In the "parallel-off mode", the breaker 28 is shut off such that the second power conversion circuit 22 is disconnected from the electric power grid 1. The parallel-off mode can be also referred to as a "stand-alone mode" in which the wind power generation system 10 is operating alone.

During the power generation standby mode, the PCS control unit 23 causes the first power conversion circuit 21 to serve as a gate block. During the power generation standby mode and the parallel-off mode, the PCS control unit 23 controls the second power conversion circuit 22 to convert power received from the first power storage element 33 via the first passing point Q1 to third AC power P3.

The third AC power P3 has a preset voltage and a preset frequency. When the third AC power P3 is being outputted, the second power conversion circuit 22 serves as an AC voltage source.

As has been explained with use of FIG. 1, the auxiliary device 13, the auxiliary device 14, the auxiliary device control power source unit 15, and the PCS control power source unit 24 can receive the second AC power P2 via the second passing point Q2 when the wind power generation system 10 is generating power.

On the other hand, as has been explained with use of FIG. 2, the auxiliary device 13, the auxiliary device 14, the auxiliary device control power source unit 15, and the PCS control power source unit 24 can receive the third AC power P3 via the second passing point Q2 during the power generation standby mode of the wind power generation system 10. That is, during the power generation standby mode of the wind power generation system 10, the third AC power P3 can be generated from power of the first power storage element 33, and the third AC power P3 can be given to the auxiliary device 13 and the auxiliary device 14. As a result, extraction of power for the auxiliary device 13 and the auxiliary device 14 from the electric power grid 1 can be suppressed.

Figure 3:
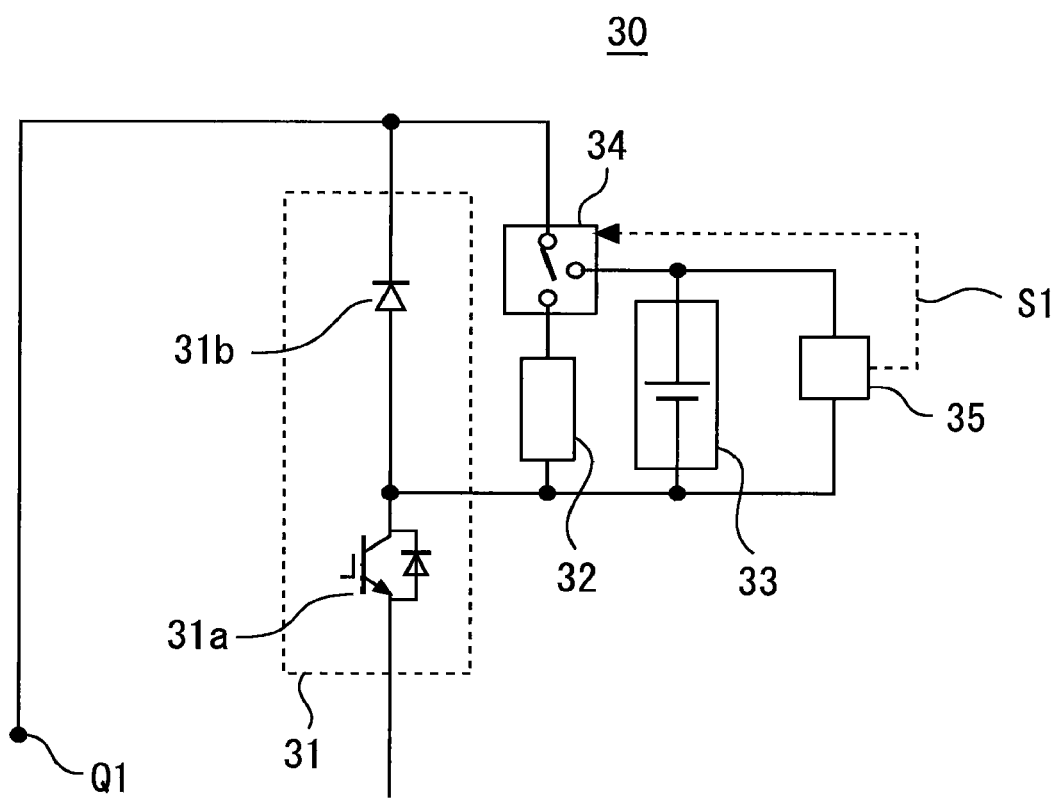
FIG. 3 is a diagram illustrating the configuration of the energy consumption circuit according to the embodiment.

FIG. 3 is a diagram illustrating the configuration of the energy consumption circuit 30 according to the embodiment. As illustrated in FIG. 3, the energy consumption circuit 30 includes the chopper circuit 31, the resistor 32, a switch 34, and a switch control circuit 35.

The chopper circuit 31 is connected to the first passing point Q1, and converts the power received from the first passing point Q1 during execution of FRT (fault ride through). The first power storage element 33 is provided on the output side of the chopper circuit 31. The first power storage element 33 may be a storage battery or a capacitor.

The resistor 32 is used to consume power outputted from the chopper circuit 31 during execution of FRT. The switch 34 selectively connects the resistor 32 and the first power storage element 33 to the chopper circuit 31.

The first power storage element 33 is charged by the following operation. The switch control circuit 35 controls the switch 34 by transmitting a switch signal S1 to the switch 34. When the charge amount in the first power storage element 33 is equal to or higher than a predetermined threshold, the switch control circuit 35 controls the switch 34 to connect the chopper circuit 31 to the resistor 32. When the charge amount in the first power storage element 33 is less than the predetermined threshold, the switch control circuit 35 controls the switch 34 to connect the chopper circuit 31 to the first power storage element 33.

As a result of establishment of connection between the chopper circuit 31 and the first power storage element 33 during execution of FRT, the first power storage element 33 stores at least a part of the output power from the chopper circuit 31.

As a result of addition of the first power storage element 33 to the chopper circuit 31, power that cannot reversely flow to the electric power grid 1 during execution of FRT can be stored into the first power storage element 33. The power stored in the first power storage element 33 can be reused, as needed. Therefore, power loss that is generated due to execution of FRT can be reduced.

Power stored in the first power storage element 33 is used by the following operation. During the power generation standby mode, the chopper circuit 31 transmits the power in the first power storage element 33 to the second power conversion circuit 22. Specifically, during the power generation standby mode, the PCS control unit 23 turns on a switching element of the chopper circuit 31 such that the first power storage element 33 and the first passing point Q1 are electrically connected. During the power generation standby mode, the third AC power P3 is generated from the power from the first power storage element 33, and thus, the third AC power P3 can be supplied to the auxiliary device 13 and the auxiliary device 14.

The wind power generation system 10 is configured to supply the third AC power P3 at least to the yaw motor of the auxiliary device 14 during the power generation standby mode. When the wind speed is low, the yaw motor is preferably driven in order to rotate the nacelle in the wind direction. However, if the wind speed is so low that the wind power generation system 10 has to be on standby for power generation, no generated power from the wind power generation system 10 can be given to the auxiliary device 13 and the auxiliary device 14. Therefore, the third AC power P3 generated from the power of the first power storage element 33 can be supplied to the yaw motor. Accordingly, the yaw motor can be driven even when the wind power generation system 10 is in the power generation standby mode.

Figure 4:
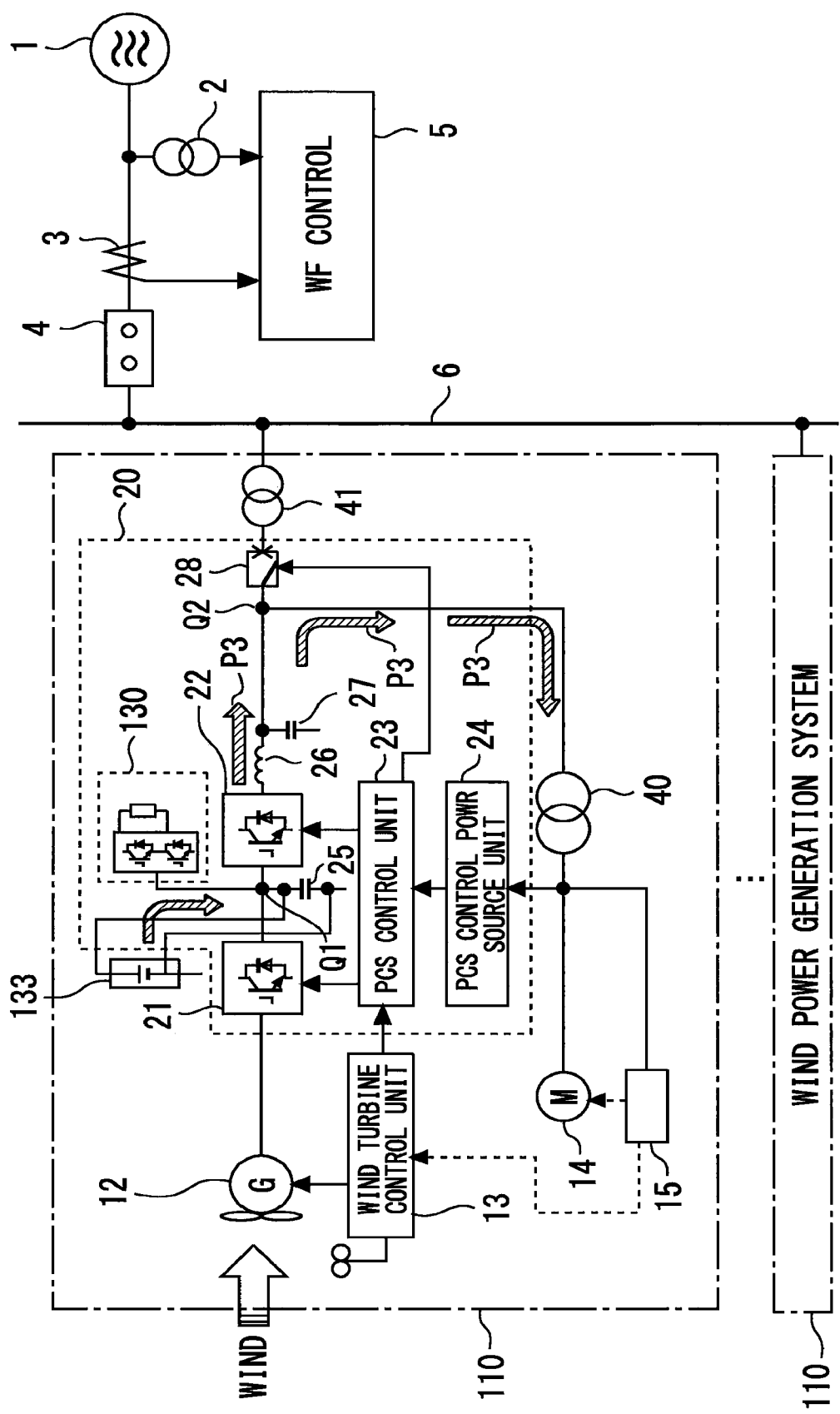
FIG. 4 is a diagram illustrating the configuration of a wind power generation system and the power conversion apparatus according to a modification of the embodiment, and also illustrating the operation during a power generation standby mode thereof.

FIG. 4 is a diagram illustrating the configuration of a wind power generation system 110 and the power conversion apparatus 20 according to a modification of the embodiment, and also illustrating the operation during a power generation standby mode thereof. The wind power generation system 110 according to the modification differs from the wind power generation system 10 illustrated in FIGS. 1 and 2 in the following difference.

The difference according to the modification is that the energy consumption circuit 30 is replaced with an energy consumption circuit 130. The energy consumption circuit 130 does not include the first power storage element 33, but, except for this, has a configuration identical to that of the energy consumption circuit 30.

The wind power generation system 110 according to the modification further includes the second power storage element 133 that is connected in parallel with the DC capacitor 25. In the embodiment, the size of the second power storage element 133 may be large because the second power storage element 133 is an external type storage battery or capacitor that is provided outside the power conversion apparatus 20.

The second power storage element 133 stores power by receiving DC power resulting from conversion at the first power conversion circuit 21 via the first passing point Q1, during the power generation mode of the wind power generation system 110.

During the power generation standby mode, the PCS control unit 23 brings the breaker 28 into the shut-off state so as to bring the wind power generation system 110 into the parallel-off mode. The second power conversion circuit 22 receives the power from the second power storage element 133 via the first passing point Q1. The PCS control unit 23 controls the second power conversion circuit 22 to convert the power from the second power storage element 133 to the third AC power P3.

As described above, also in the wind power generation system 110 according to the modification, the third AC power P3 can be generated from power stored in the second power storage element 133, and can be supplied to the auxiliary device 14 and the like, during the power generation standby mode.

Figure 5:
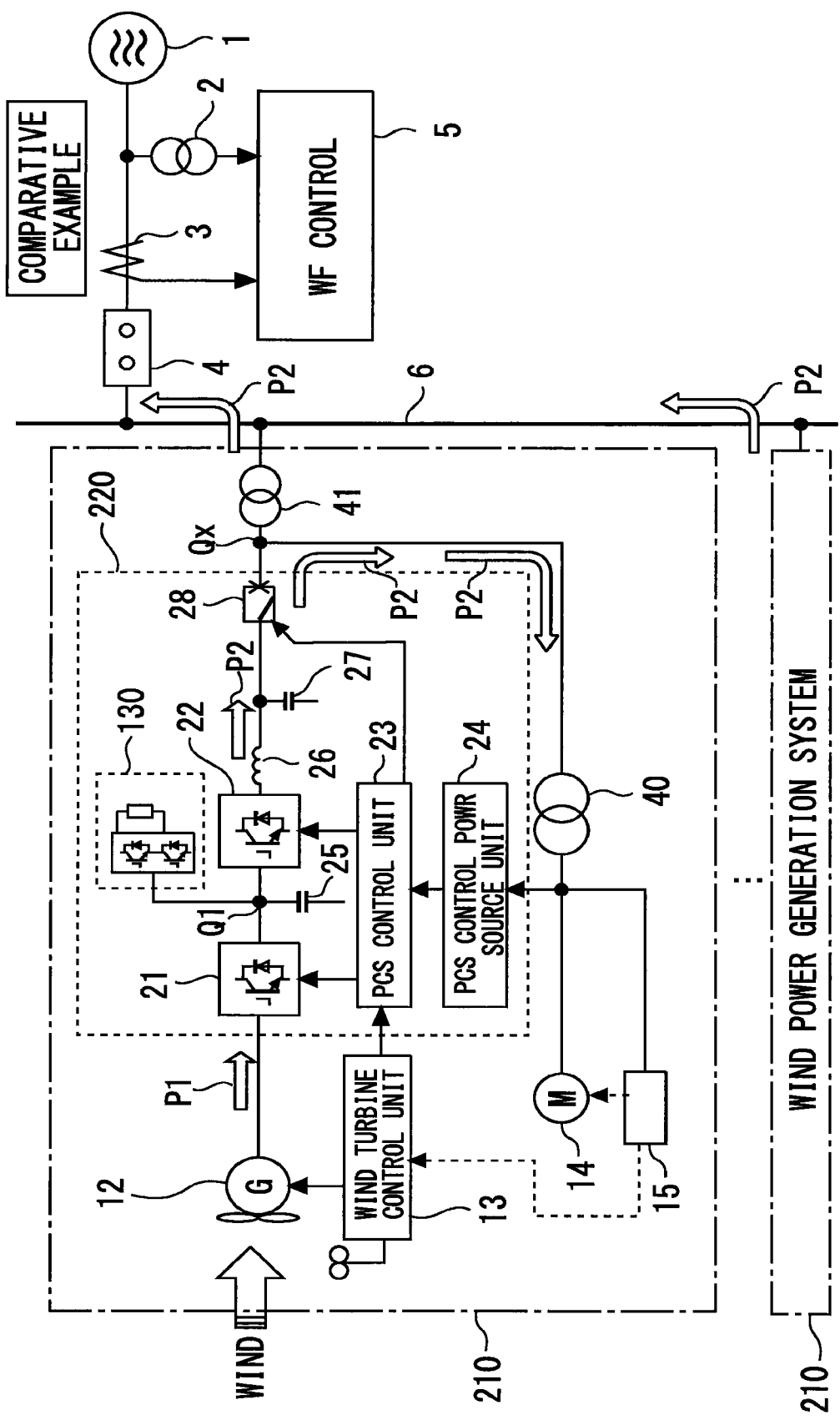
FIG. 5 is a diagram illustrating the configuration of a wind power generation system and a power conversion apparatus according to a comparative example, and also illustrating the operation during a power generation mode thereof.
Figure 6:
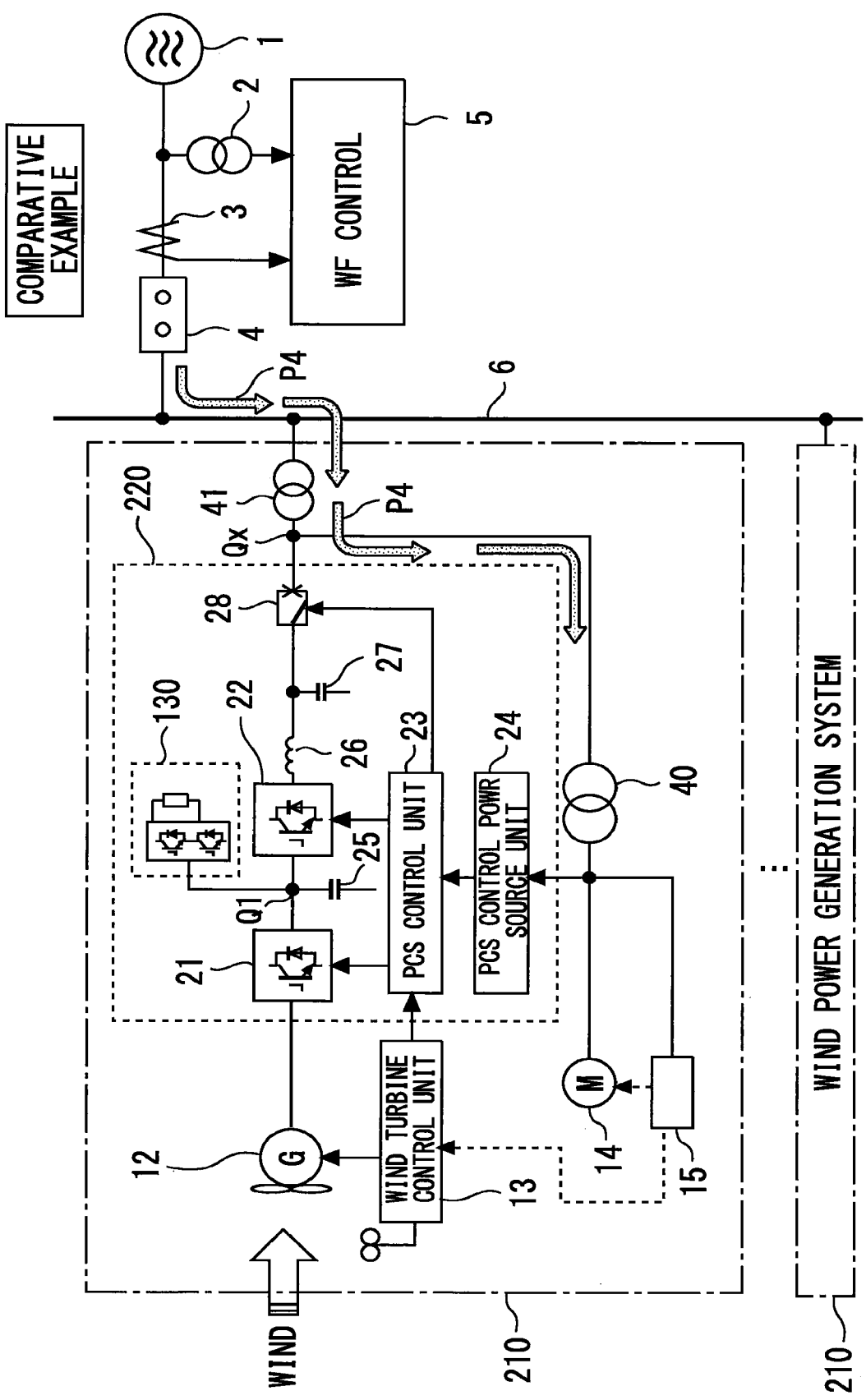
FIG. 6 is a diagram illustrating the configuration of the wind power generation system and the power conversion apparatus according to the comparative example, and also illustrating the operation during a power generation standby mode thereof.

FIG. 5 is a diagram illustrating the configuration of a wind power generation system 210 and a power conversion apparatus 220 according to a comparative example, and also illustrating the operation during a power generation mode thereof. FIG. 6 is a diagram illustrating the configuration of the wind power generation system 210 and the power conversion apparatus 220 according to the comparative example, and also illustrating the operation during a power generation standby mode thereof.

The wind power generation system 210 according to the comparative example differs from the wind power generation system 10 illustrated in FIGS. 1 and 2, in the following differences. A first difference is that, in the comparative example, no third AC power P3 is outputted from the second power conversion circuit 22.

A second difference is that one end of the transformer 40 is connected not to the second passing point Q2, but to another passing point Qx. The other passing point Qx is provided on an electric path between the breaker 28 and the transformer 41.

A third difference is that the energy consumption circuit 30 is replaced with the energy consumption circuit 130. The energy consumption circuit 130 does not include the first power storage element 33, but, except for this, has a configuration identical to that of the energy consumption circuit 30.

Further, the wind power generation system 210 according to the comparative example does not include the second power storage element 133 according to the modification in FIG. 4.

In the comparative example, during power generation in FIG. 5, the second AC power P2 is supplied to the electric power grid 1, the auxiliary device 14, and the like, as in the embodiment. However, in the comparative example, grid AC power P4 from the electric power grid 1 is supplied to the auxiliary device 14 and the like, during the power generation standby mode illustrated in FIG. 6. As a result, the comparative example has a problem that the consumption of power from the electric power grid 1 is large.

Regarding this point, the embodiment has an advantage that power supply to the auxiliary device 13, the auxiliary device 14, and the like, can be covered not by the grid AC power P4 but by the third AC power P3.

The power conversion apparatus 20 according to the embodiment may be used not in the wind power generation system 10, but in another power system. The power conversion apparatus 20 includes the first power conversion circuit 21, the second power conversion circuit 22, the chopper circuit 31, the resistor 32, the first power storage element 33, and the switch 34. Accordingly, output power from the chopper circuit 31 can be given to the first power storage element 33 via the switch 34, whereby at least a part of power that cannot reversely flow to the grid during execution of FRT can be stored.

REFERENCE SIGNS LIST 1 electric power grid
2 transformer
3 current meter
4 high-order breaker
5 WF (wind farm) control unit
6 transmission line
10, 110, 210 wind power generation system
12 power generator body
13 auxiliary device (wind turbine control unit)
14 auxiliary device (motor part)
15 auxiliary device control power source unit
20, 220 power conversion apparatus
21 first power conversion circuit
22 second power conversion circuit
23 PCS control unit
24 PCS control power source unit
25 DC capacitor
26 AC reactor
27 AC capacitor
28 breaker
30, 130 energy consumption circuit
31 chopper circuit 32 resistor
33 first power storage element
34 switch
35 switch control circuit
40, 41 transformer
133 second power storage element
P1 first AC power
P2 second AC power
P3 third AC power
P4 grid AC power
Q1 first passing point
Q2 second passing point
Qx another passing point

The invention claimed is:

1. A wind power generation system comprising:
a power generator body that generates first AC power from wind power;
an auxiliary device that assists the power generator body; and
a power conversion apparatus that converts the first AC power from the power generator body to second AC power, and outputs the second AC power to an electric power grid, wherein
the power conversion apparatus includes
a first power conversion circuit that converts the first AC power to DC power,
a second power conversion circuit that converts the DC power resulting from conversion at the first power conversion circuit to the second AC power,
a breaker that is provided between the second power conversion circuit and the electric power grid, and
control circuitry that controls the second power conversion circuit and the breaker, wherein the breaker is provided between the control circuitry and the electric power grid to disconnect the control circuitry from the electric power grid when the breaker is shut off,
the wind power generation system further comprises a power storage element that stores power by receiving the DC power from the first power conversion circuit via a first passing point provided between the first power conversion circuit and the second power conversion circuit, wherein
when the power generator body is generating power, the control circuitry brings the breaker into conduction to set a grid-connected operation mode in which the second power conversion circuit cooperates with the electric power grid, and controls the second power conversion circuit to convert the DC power from the first power conversion circuit to the second AC power during the grid-connected operation mode,
when the power generator body is in a power generation standby state which is a time period of being on standby for power generation, the control circuitry shuts off the breaker to set a parallel-off mode in which the second power conversion circuit is disconnected from the electric power grid, and controls the second power conversion circuit to convert power of the power storage element received by the second power conversion circuit via the first passing point, to third AC power having a preset voltage,
the auxiliary device is configured to receive the second AC power in the grid-connected operation mode and the third AC power in the parallel-off mode, the second and third AC power being outputted from the second power conversion circuit via a second passing point provided between the second power conversion circuit and the breaker,
the auxiliary device includes a wind turbine control unit and a yaw motor for adjusting a direction of a nacelle, and
the wind turbine control unit and the yaw motor are configured to receive the third AC power via the second passing point during the power generation standby state.

2. The wind power generation system according to claim 1, wherein
the power conversion apparatus further includes
a chopper circuit that is connected to the first passing point and that converts power received from the first passing point, and
a resistor for consuming power outputted from the chopper circuit,
the power storage element includes a first power storage element that is provided on an output side of the chopper circuit inside the power conversion apparatus and that stores at least a part of output power from the chopper circuit, and
the chopper circuit transmits power of the first power storage element to the second power conversion circuit during the power generation standby state.

3. The wind power generation system according to claim 1, wherein
the power conversion apparatus further includes a DC capacitor that is connected to the first passing point between the first power conversion circuit and the second power conversion circuit, and
the power storage element includes a second power storage element that is provided outside the power conversion apparatus and is connected in parallel with the DC capacitor.

* * * * *